US008726231B2

(12) United States Patent
Sirr et al.

(10) Patent No.: US 8,726,231 B2
(45) Date of Patent: May 13, 2014

(54) SUPPORT FOR HETEROGENEOUS DATABASE ARTIFACTS IN A SINGLE PROJECT

(75) Inventors: Patrick E. Sirr, Bellevue, WA (US); Fabian O. Winternitz, Sammamish, WA (US); Jill M. McClenahan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 13/019,311

(22) Filed: Feb. 2, 2011

(65) Prior Publication Data
US 2012/0198416 A1 Aug. 2, 2012

(51) Int. Cl.
G06F 9/44 (2006.01)
(52) U.S. Cl.
USPC ........... 717/110; 717/106; 717/107; 717/104; 717/111
(58) Field of Classification Search
None
See application file for complete search history.

(56) References Cited

U.S. PATENT DOCUMENTS

| | | | |
|---|---|---|---|
| 6,539,396 B1* | 3/2003 | Bowman-Amuah | 707/769 |
| 6,578,068 B1* | 6/2003 | Bowman-Amuah | 709/203 |
| 6,601,233 B1* | 7/2003 | Underwood | 717/102 |
| 6,804,682 B1 | 10/2004 | Kemper et al. | |
| 7,127,707 B1 | 10/2006 | Mishra et al. | |
| 8,473,894 B2* | 6/2013 | Fox et al. | 717/101 |
| 2008/0201355 A1* | 8/2008 | Bloesch et al. | 707/102 |
| 2008/0281863 A1* | 11/2008 | Pospisil et al. | 707/103 R |
| 2008/0301641 A1* | 12/2008 | Bojjireddy et al. | 717/121 |
| 2009/0037873 A1 | 2/2009 | Ahadian et al. | |
| 2009/0254877 A1* | 10/2009 | Kuriakose et al. | 717/105 |
| 2009/0327324 A1 | 12/2009 | Laflen et al. | |
| 2010/0070231 A1* | 3/2010 | Hanumant | 702/123 |
| 2010/0095373 A1* | 4/2010 | Levenshteyn et al. | 726/21 |
| 2010/0169234 A1* | 7/2010 | Metzger et al. | 705/348 |
| 2010/0211924 A1* | 8/2010 | Begel et al. | 717/101 |
| 2012/0005190 A1* | 1/2012 | Faerber et al. | 707/718 |
| 2012/0109934 A1* | 5/2012 | Weyerhaeuser et al. | 707/713 |
| 2012/0151443 A1* | 6/2012 | Rohde et al. | 717/121 |
| 2012/0159438 A1* | 6/2012 | Plate | 717/121 |
| 2012/0284685 A1* | 11/2012 | Winternitz | 717/104 |
| 2013/0117733 A1* | 5/2013 | Ahmed et al. | 717/140 |

OTHER PUBLICATIONS

Jachimowicz, Wojciech., "Amethyst Puts Flash in Visual Studio But can it compete with Silverlight?", Retrieved at << http://flashflex.com/amethyst-puts-flash-in-visual-studio-but-can-it-compete-with-silverlight/ >>, Jun. 30, 2010, pp. 7.

"Walkthrough: Code Editing in Web Pages in Visual Studio", Retrieved at << http://msdn.microsoft.com/en-us/library/s8e942hh.aspx >>, Retrieved Date: Nov. 29, 2010, pp. 5.

(Continued)

*Primary Examiner* — Chameli Das
(74) *Attorney, Agent, or Firm* — Nicholas Chen; Kate Drakos; Micky Minhas

(57) ABSTRACT

A single software project can include heterogeneous types of artifacts. The artifact definition can be converted to a format compatible with a common model or information derived from the artifacts can be added to the common model so that tools that operate on the common model can provide information derived from the heterogeneous artifacts to developers during design time in an IDE. Build and deployment tools can operate over a more inclusive universe of data to provide a more accurate deployment plan. Build and deployment tools can operate within the context of the IDE or from the command line.

20 Claims, 6 Drawing Sheets

(56) References Cited

OTHER PUBLICATIONS

"Using IntelliSense", Retrieved at << http://msdn.microsoft.com/en-us/library/hcw1s69b.aspx >>, Retrieved Date: Nov. 29, 2010, pp. 2.

"XRefactory: refactoring browser for Emacs, XEmacs & jEdit", Retrieved at << http://www.testdriven.com/2004/09/xrefactory_refactoring_browser_for_emacs_xemacs_jedit/ >>, Sep. 16, 2004, pp. 5.

* cited by examiner

```
CREATE XML SCHEMA COLLECTION ProductDescriptionSchemaCollection AS — 252    ⟋254
<xsd:schema
targetNamespace="http://schemas.microsoft.com/sqlserver/2004/07/adventure-works/   250
ProductModelWarrAndMain"
  xmlns="http://schemas,microsoft.com/sqlserver/2004/07/adventure-works/ProductModelWarrAndMain"
  elementFormDefault="qualified"
Xmlns:xsd="http://www.w3.org/2001/XMLSchema" >
  <xsd:element name="Warranty" >
    <xsd:complexType>
      <xsd:sequence>
        <xsd:element name=WwarrantyPeriod" type="xsd:string" />
        <xsd:element name="Description" type="xsd:string" />
      </xsd:sequence.
    </xsd:complexType>
  </xsd:element>
</xsd:schema>
<xs:schema
targetNamespace="http://schemas.microsoft.com/sqlserver/2004/07/adventure-works/
ProductModelDescription"
  xmlns="http://schemas.microsoft.com/sqlserver/2004/07/adventure-works/ProductModelDescription"
  elementFormDefault="qualified"
  xmlns:mstns="http://tempuri.org/XMLSchema.xsd"
  xmlns:xs"http://www.w3.org/2001/XMLSchema"
  xmlns:wm="http://www.w3.org/2001/XMLSchema"
  xmlns:wm="http;//schemas.microsoft.com/sqlserver/2004/07/adventure-sorks/
ProductModelWarrAndMain" >
  <xs:import
Namespace="http://schemas.microsoft.com/sqlserver/2004/07/adventure-works/
ProductModelWarrAndMain" />
  <xs:element name="ProductDescription" type="ProductDescription" />
    <xs:complexType name="productDescription">
      <xs:sequence>
        <xs:element name="Summary" type="Summary" minOccurs=")" />
      </sx:sequence.
      <xs:attribute name="productModelID" type="xs:string" />
      <xs:attribute name="productModelName" type="xs:string" />
    </xs:complexType>
    <xs:complexType name=Suummary" mixed="true" >
      <xs:sequence>
        <xs:any processContents="skip"
Namespace="http://www.w3.org/1999/xhtml" minOccurs="0" maxOccurs="unbounded"/>
      </xs:sequence>
    </xs:complexType>
</xs:schema>
```

SUPPORT FOR HETEROGENEOUS DATABASE ARTIFACTS IN A SINGLE PROJECT

BACKGROUND

An integrated development environment (IDE) is a software application that provides functionalities for software development. An IDE, also sometimes called an integrated design environment or integrated debugging environment, typically includes a source code editor, a compiler and/or an interpreter, build automation tools and a debugger. Some IDEs include a version control system. An IDE can also include tools used for development of object-oriented software including but not limited to a class browser, an object inspector, and class hierarchy visualization tools. Other tools can also be included in an IDE.

An IDE is designed to increase developer productivity by providing integrated components that usually have similar user interfaces to reduce the learning curve. Typically an IDE is dedicated to a specific programming language, so as to provide a feature set which most closely matches the programming paradigms of the language. However, some multiple-language IDEs are in use, including Eclipse, ActiveState Komodo, NetBeans, Microsoft Visual Studio®, WinDev, and Xcode.

Known IDEs do not support heterogeneous database artifacts within the same project. For example, a developer who uses Microsoft's Visual Studio® has to keep T-SQL artifacts in one Visual Studio project, XSD artifacts in another Visual Studio project, C# SQL CLR artifacts in a third Visual Studio project and VB.NET SQL CLR artifacts in still another Visual Studio project. This is true because the languages behind each of the different kinds of artifacts is different. Because the languages behind the different types of artifacts is different, supporting a seamless developer experience when moving from one language to another language is difficult. Because editing tools including but not limited to auto-completion, debugging and refactoring tools typically do not cross project boundaries, these tools do not provide comprehensive information to the developer when a solution includes multiple project types. Other tools such as tools for automated deployment may generate incorrect deployment plans because they are operating on a subset of the actual data.

SUMMARY

An IDE can provide integrated software development tools to create and manage database artifacts for a plurality of types of database artifacts by incorporating information associated with the heterogeneous types of database artifacts into a common model within a single software project. Heterogeneous language services can be hosted within the same project, enabling different language-specific editing experiences to be provided within a single project. Tools that operate on the common model can include tools for creation and management of the database artifacts, tools that provide auto-completion and member lists for the database artifacts, tools for refactoring the database artifacts, tools for debugging the database artifacts and tools for deployment of the software project. Different types of artifacts can be stored in the same project and information associated with the artifacts can be stored in a common model. The information stored in the common model can include definitions of model elements and relationships between model elements. This enables various types of database artifacts to exist in the same project and to be correctly processed by program development tools. For example, a T-SQL file can be interpreted and database elements created when the T-SQL file is executed can be added to the common model, an XSD file can be determined to be a part of an XML Schema Collection and the schema collection definition can be added to the common model and/or a program file can be compiled into an executable (e.g., compiled into an assembly as a SQLCLR artifact) and definitions found in the executable can be added to the common model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 2a is an example of an XSD file wrapped in a T-SQL CREATE statement in accordance with aspects of the subject matter disclosed herein;

DETAILED DESCRIPTION

Overview

A single software project within an IDE can include heterogeneous database artifacts including but not limited to T-SQL, XSD and program code such as but not limited to VB.NET and/or C# code. T-SQL files can be interpreted or analyzed and information derived from the interpreted or analyzed files can be added to a common database schema model. XSD files can be wrapped in a T-SQL XML Schema Collection CREATE statement and can be added to the common database schema model. The XML Schema Collection schema can be extracted, added to the common model and can be used in the database for creating database table columns having that schema. Language files can be compiled into an executable such as but not limited to a dll, an assembly (e.g., in MSIL Microsoft Source Intermediate Language) or can be interpreted into bytecode, etc. The assembly, bytecode or executable can be wrapped into a valid T-SQL statement and can be added to a database such as a SQL database. Information derived from the compiled or interpreted code can be added to the common model. For example, definitions for public types found in the assembly can be added to the common model enabling stored procedures in the project to call the public types.

Because model elements including artifact definitions and relationships between model elements are located in one common model, heterogeneous language services can be hosted within a single project. This enables a user to switch language services (e.g., from C# to VB.NET or vice versa) without closing one project and opening another. Refactoring can operate on the entire database schema. When, how and what needs to be refactored can be determined. A particular refactoring operation can be driven by the appropriate language service in the project. For example, if a C# artifact needs to be refactored, the refactoring task can be delegated to the C# language service. Auto-completion tools such as but not limited to Microsoft's IntelliSense® can draw from heterogeneous artifacts including but not limited to T-SQL, XSD and SQL CLR constructs to provide robust auto-completion feedback during design time development. A seamless cross-language debugging experience can be provided to the developer or user. For example, if a developer in a debugging session steps into an XML Schema Collection or steps into an XPath query, the associated XSD source code can be displayed in the same debug session in which a C# program was debugged without initiating a new debugging session or closing one project and opening another. Build tasks that are not capable of working on multiple projects, have access to the entire database schema instead of having access to a subset of the database schema, allowing for creation of a correct database deployment plan.

Support For Heterogeneous Database Artifacts in a Single Project

Figure 1A:
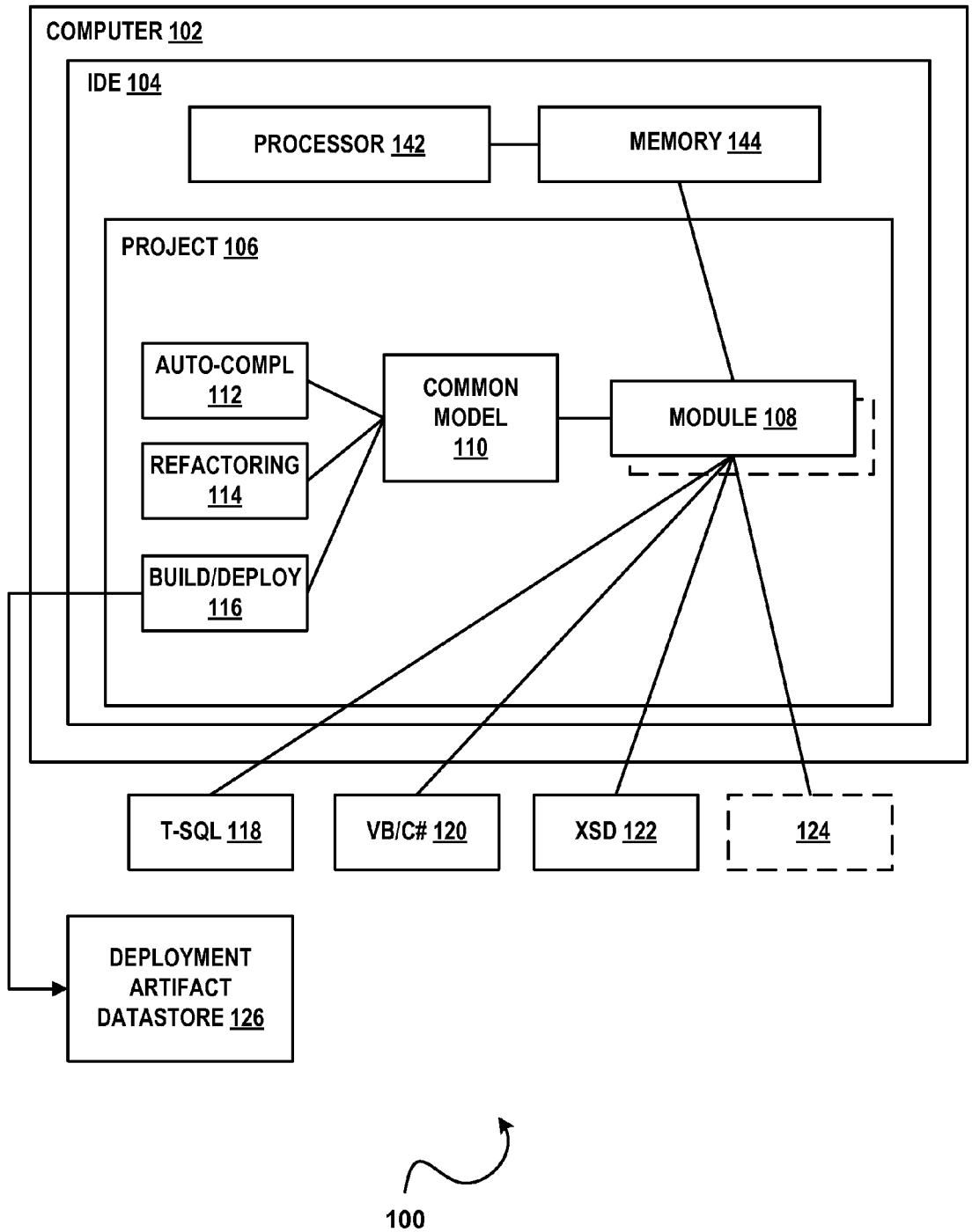
FIG. 1a illustrates an example of a system 100 for supporting heterogeneous database artifacts in a software project in accordance with aspects of the subject matter disclosed herein.

FIG. 1a illustrates an example of a system 100 for supporting heterogeneous database artifacts in a single project 106 of an IDE 104. All or portions of system 100 may reside on one or more computers such as the computers described below with respect to FIG. 3. All or portions of system 100 may reside on one or more software development computers such as the computers described below with respect to FIG. 4. The system 100 or portions thereof may comprise a portion of an integrated development environment (IDE) such as the ones described and illustrated below with respect to FIG. 4. System 100 or portions thereof may be provided as a stand-alone system or as a plug-in or add-in.

System 100 may include one or more of a computer 102 comprising: a processor such as processor 142, a memory such as memory 144, and one or more modules such as module 108, etc. for supporting heterogeneous database artifacts in a single project. Other components well known in the arts may also be included but are not here shown. It will be appreciated that one or more modules such as module 108, etc. can be loaded into memory 144 to cause one or more processors such as processor 142 to perform the actions attributed to the one or more modules for supporting heterogeneous database artifacts in a single project.

In operation, artifacts including but not limited to T-SQL artifacts such as T-SQL artifact 118, XSD artifacts such as XSD artifact 122, program language artifacts such as a VB.NET and/or C# artifact 120 and other artifacts 124 can be created and managed in the IDE 104 as is known in the arts. A module such as module 108, etc., can receive these artifacts and transform information derived from the artifacts into a common model 110. A module such as module 108, etc., can derive information from these artifacts and add the information derived from the artifacts into a common model 110. For example, a T-SQL file in which a new table is created can be examined and in response to determining that the new table is created, a definition for the new table can be added to the common model 110. Module 108, etc. can receive the artifacts and can convert the artifacts into a valid T-SQL statement, as described more fully below. Placement of the various artifact definitions and relationships between artifacts in a common model (e.g., common model 110) enables information about the objects including but not limited to types, names, dependencies, validation rules for values for the object, physical location, relationships between objects and so on to be available to the tools in the IDE. For example, when a developer performs an operation on an object in the project, relationships between the object and other objects can be traced and information associated with the relationships can be displayed to the developer. For example, in response to an operation renaming an object called "AddressID" to "MyAddress", relationships can be traversed so that all the code affected by the operation can be displayed and changed.

One type of artifact received by module 108, etc. can be a Transact-SQL (T-SQL) artifact. T-SQL is a proprietary extension to SQL. SQL, Structured Query Language, is a database computer language designed for managing data in relational database management systems (RDBMS). A SQL database can include tables, views, programmability objects, security objects including but not limited to logins, management objects (e.g., what disk drive to use for the database) and so on. SQL includes programming constructs for data insertion, query, updating and deletion, schema creation and modification, and data access control. T-SQL can be used with Microsoft's SQL Server software. Applications that communicate with an instance of SQL Server communicate by sending T-SQL statements to the server, regardless of the user interface of the application. T-SQL augments SQL with additional features including but not limited to control-of-flow language, local variables, various support functions for string processing, date processing, mathematics, etc., changes to DELETE and UPDATE statements and so on. In accordance with aspects of the subject matter disclosed herein, a T-SQL artifact 118 can be interpreted and added to a common database schema model such as common model 110. For example, the text of a particular T-SQL artifact may create a new database table and describe its contents. The T-SQL artifact can be interpreted to determine the name and attributes of the table and the common model can be updated with the information about the new table.

In SQL Server, the ability to create XML Schema Collections exists. XSD (XML Schema Definition) is the schema language of the World Wide Web Consortium (W3C), an international standards organization for the World Wide Web. The consortium is made up of member organizations that work together to develop standards for the World Wide Web. XSD is one of several XML schema languages. The acronym "XSD" is sometimes also used to refer to XML Schema Document, a document written in the XML Schema language, typically containing the "xsd" XML namespace prefix and stored with the ".xsd" filename extension. The XSD schema language is sometimes referred to as WXS, an acronym for W3C XML Schema. XSD can be used to express a set of rules to which an XML document has to conform in order to be considered "valid" according to that schema. However, unlike most other schema languages, XSD was also designed with the intent that determination of a document's validity would produce a collection of information adhering to specific data types. Such a post-validation information set can be useful in the development of XML document processing software.

XSD artifacts such as XSD artifact 122 can be received by a module such as module 108, etc. Module 108, etc. can wrap the XSD file in a T-SQL XML Schema Collection CREATE statement (fragment), enabling the XSD artifact to be added to the database. An example of an XSD file 250 is included in FIG. 2a. The XSD file 250 is wrapped in the T-SQL XML Schema Collection CREATE statement 252. The schema 254 can be extracted and placed into the common model 110. XSD may also drive how information in Microsoft's IntelliSense® is presented to the user. For example, the Visual Basic Code Editor includes IntelliSense features for XML that provide word completion for elements defined in an XML schema. If, for example, an XML Schema Definition (XSD) file is included in a project and the user imports the target namespace of the schema (e.g., by using the Imports statement), the Code Editor can include elements from the XSD schema in the IntelliSense list of valid member variables for XElement and XDocument objects.

SQL CLR (SQL Common Language Runtime) is a technology for hosting of the Microsoft .NET common language runtime engine within SQL Server. The SQL CLR allows managed code to be hosted by, and run in, the Microsoft SQL Server environment. SQL CLR allows users to create managed code objects in SQL Server in .NET languages including but not limited to C# and/or VB.NET. The managed code objects in SQL Server can include but are not limited to: stored procedures, analogous to procedures or void functions in procedural languages like Visual Basic or C; triggers, stored procedures that fire in response to Data Manipulation Language (DML) or Data Definition Language (DDL) events; programmability objects including but not limited to user-defined functions (UDFs), analogous to functions in procedural languages; user-defined aggregates (UDAs), allowing developers to create custom aggregates that act on sets of data instead of on one row at a time; and user-defined types (UDTs), allowing users to create simple or complex data types which can be serialized and deserialized within the database. The SQL CLR relies on the creation, deployment, and registration of .NET assemblies, which are physically stored in managed code dynamic load libraries (DLLs). These assemblies may contain or include .NET namespaces, classes, functions and properties. Program code (e.g., the dll, assembly, etc.) can be wrapped in a T-SQL statement and added to the database in the project.

It will be appreciated that while particular examples of input to module 108 have been described, other inputs are contemplated. For example, SQL artifacts or artifacts written in another database computer language (e.g., artifacts written in Javascript for an Oracle database) in addition to or instead of T-SQL artifacts can be received. Similarly, in addition to or instead of XSD artifacts, artifacts in another schema language can be received. Similarly, in addition to or instead of receiving program modules written in a managed code language such as VB.NET or C#, program modules written in other managed code languages including but not limited to F#, dylan.NET, COBOL, Perl, Python, Eiffel and so on or in other compiled or interpreted native code languages including but not limited to: Ada, ALGOL, Ateji PX, BASIC, C, C++, CLIPPER 5.3, CLEO, CLush (Lush), COBOL, Cobra, Common Lisp, Corn, Curl, D, DASL, Delphi, DIBOL, Dylan, eC, Eiffel, Factor, Forth, Fortran, Go, Haskell, Harbour, JAVA®, JOVIAL, LabVIEW, Nemerle, Objective-C, Pascal, Plus, ppC++, RPG, Scheme, Smalltalk, ML, Turing, Urq, Visual Basic, Visual FoxPro, Visual Prolog, WinDev, X++, XL, Z++and so on. Other types of artifacts are also contemplated including but not limited to catalog data, (e.g,. a list of zipcodes, Server Selection Policies-rules on what types of servers can host this database and so on. Moreover, although creation of a common model has been described herein in the context of a relational database management system, those of skill in the art will appreciated that the concepts described herein can also be applied in an object-oriented environment.

Because all the different types of heterogeneous artifacts can exist in a single project and/or information therefrom are added to a common model, design time tools including but not limited to auto-completion tools, refactoring tools and automated build and deployment tools can operate on a single project that includes heterogeneous artifacts and/or information derived therefrom and can provide comprehensive design time information that formerly was not available. For example, Microsoft's IntelliSense® provides developer support including automatically completing symbol names, providing internal documentation and disambiguation for variable names, functions and methods using reflection. Microsoft's IntelliSense® provides a convenient way to access descriptions of functions, such as for example, providing parameter lists for functions. It can speed up software development by reducing the amount of name memorization and keyboard input needed. It can reduce the need to refer to external documentation because interactive documentation on symbols including variables and functions in the active scope can appear dynamically during programming (e.g., in the form of tooltips).

Because IntelliSense® relies on accessing an automatically generated in-memory database of classes, variable names and other constructs defined in or referenced by the application being edited, adding the heterogeneous artifacts and/or information derived therefrom to the common model from which the database is generated, enables IntelliSense® to provide more comprehensive information to the developer.

Similarly, refactoring tools can provide more comprehensive results because the common model includes heterogeneous artifacts that previously had to be separated into different projects. Thus refactoring can be applied to a more inclusive universe. For example, if a variable name is changed from "name1" to "name2", name1 will be changed to name2 in T-SQL statements and XSD files and in program code. The references including but not limited to references in program code (e.g., C#/VB.NET code, etc.) can be shown in a single common refactoring dialog. Refactoring into the XSD can occur for example, if an XML schema collection name is changed. In that case the XSD and referencing xml table columns might need to be altered.

Similarly, build and deployment tools that operate within the context of the IDE can provide more comprehensive results because the universe on which they operate is more inclusive.

Figure 1B:
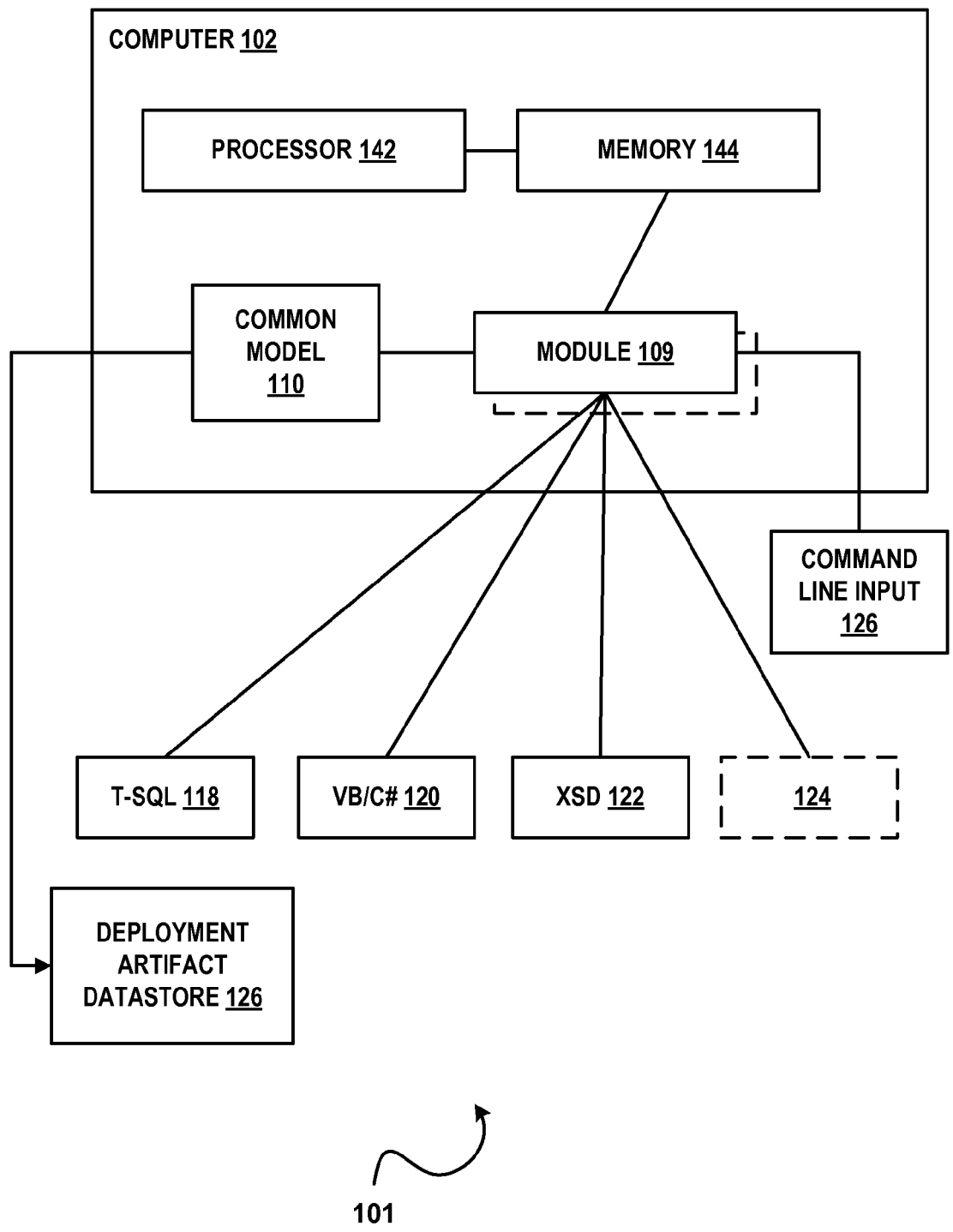
FIG. 1b illustrates another example of a system 101 for supporting creation of a deployment datastore of heterogeneous artifacts from the command line in accordance with aspects of the subject matter disclosed herein.

FIG. 1b illustrates another example of a system 101 for supporting creation of a deployment database of heterogeneous database artifacts from the command line. All or portions of system 100 may reside on one or more computers such as the computers described below with respect to FIG. 3. All or portions of system 100 may reside on one or more software development computers such as the computers described below with respect to FIG. 4. System 101 or portions thereof may be provided as a stand-alone system or as a plug-in or add-in.

System 101 may include one or more of a computer 102 comprising: a processor such as processor 142, a memory such as memory 144, and one or more modules such as module 109, etc. for supporting creation of a deployment datastore of heterogeneous artifacts from the command line. Other components well known in the arts may also be included but are not here shown. It will be appreciated that one or more modules such as module 109, etc. can be loaded into memory 144 to cause one or more processors such as processor 142 to perform the actions attributed to the one or more modules for supporting creation of a deployment datastore of heterogeneous artifacts from the command line.

In operation, in response to input from the command line 126, the artifacts including but not limited to T-SQL artifacts 118, VB.NET/C# artifacts 120, XSD artifacts 122 and/or other artifacts 124 can be received by software that builds executable programs and libraries from source code, (e.g., MSBUILD, etc.). A common model 110 can be created therefrom by module 109. A deployment artifact datastore 126 and a deployment plan (not shown) that includes all the components represented by the common model including heterogeneous database artifacts can be generated.

Figure 2B:
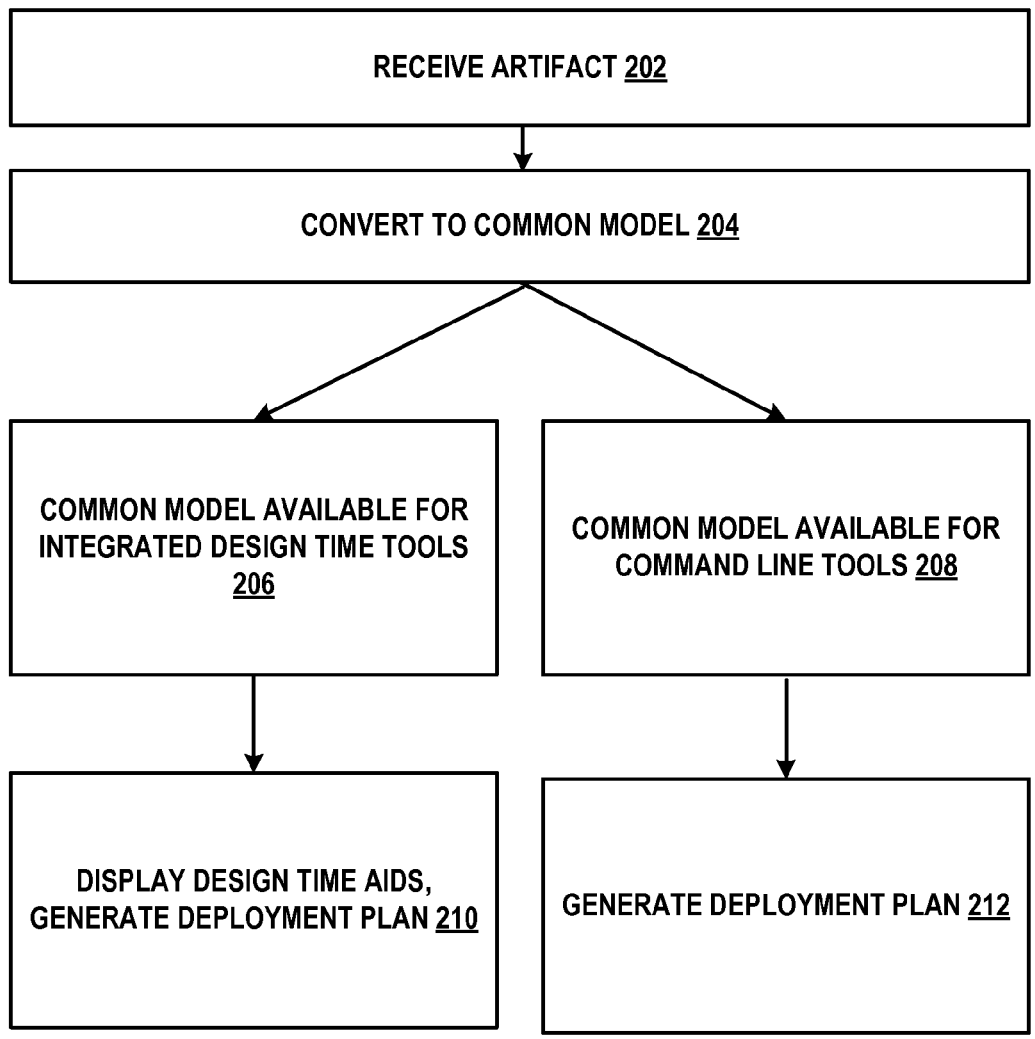
FIG. 2b is a flow diagram of an example of a method 200 for supporting heterogeneous database artifacts in a single software project in accordance with aspects of the subject matter disclosed herein.

FIG. 2b illustrates an example of a method 200 for providing support for heterogeneous artifacts in a single project in accordance with aspects of the subject matter disclosed herein. The method described in FIG. 2b can be practiced by a system such as but not limited to the one described with respect to FIG. 1a and/or by a system such as but not limited to the one described with respect to FIG. 1b. Some of the actions described below can be optional. Some of the actions described below can be executed in a sequence that differs from that described below.

At 202 a module that provides support for heterogeneous artifacts in a single project can receive an artifact. As described more fully above, the received artifact can be a T-SQL artifact, a program code artifact, an XSD artifact or other artifact. At 204, as described more fully above, the artifact can be converted into a format compatible with a common model. Information derived from the artifact can be added to the common model. At 206 information from the common model can be used to provide design time information for interactive programming activities including development of program code or build and deployment tasks. At 210, information derived from heterogeneous artifacts can be displayed in an IDE. At 208, information from the common model can be accessed from the command line to generate a deployment plan at 212.

Example of a Suitable Computing Environment

Figure 3:
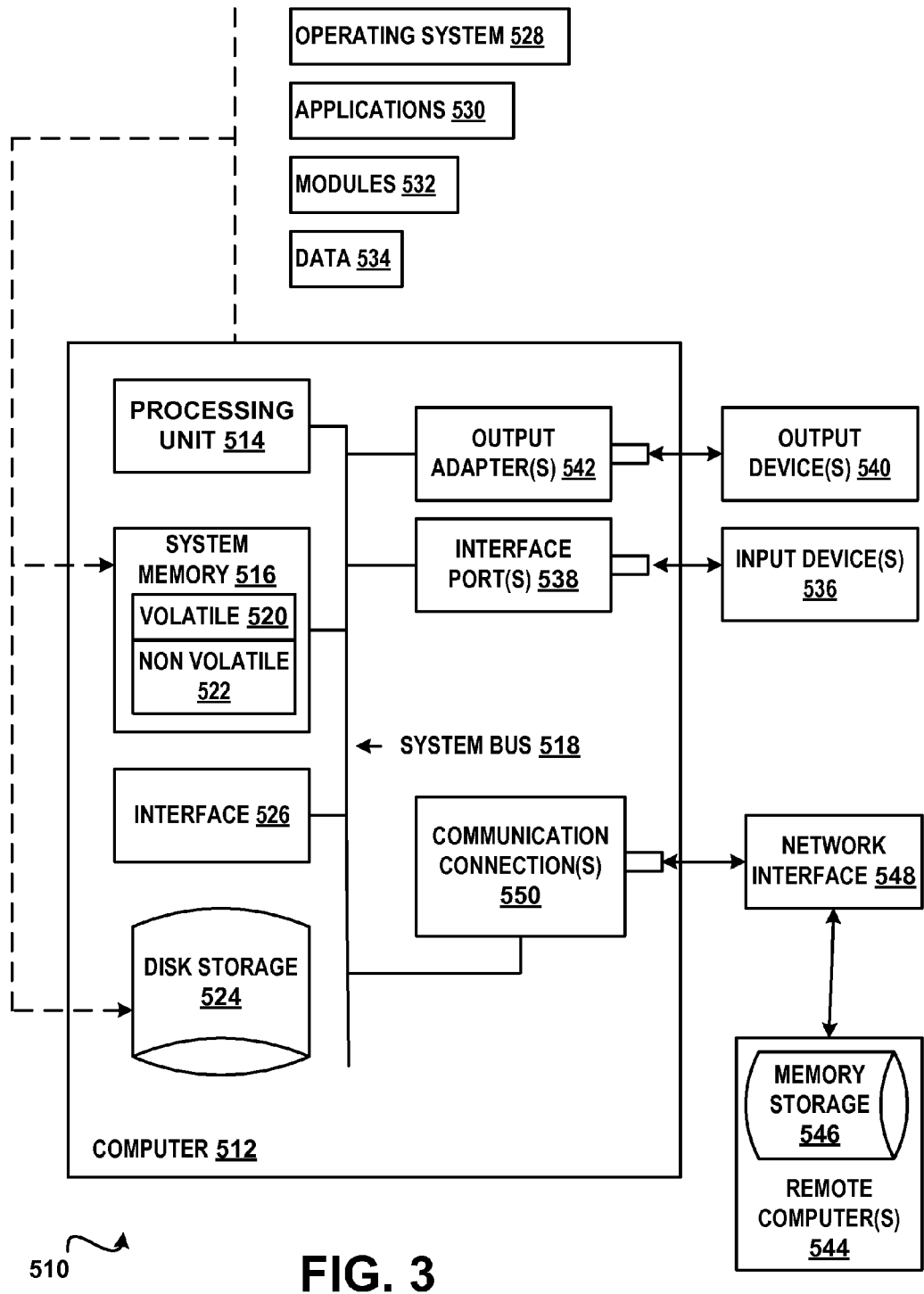
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can Object A (innermost object)and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
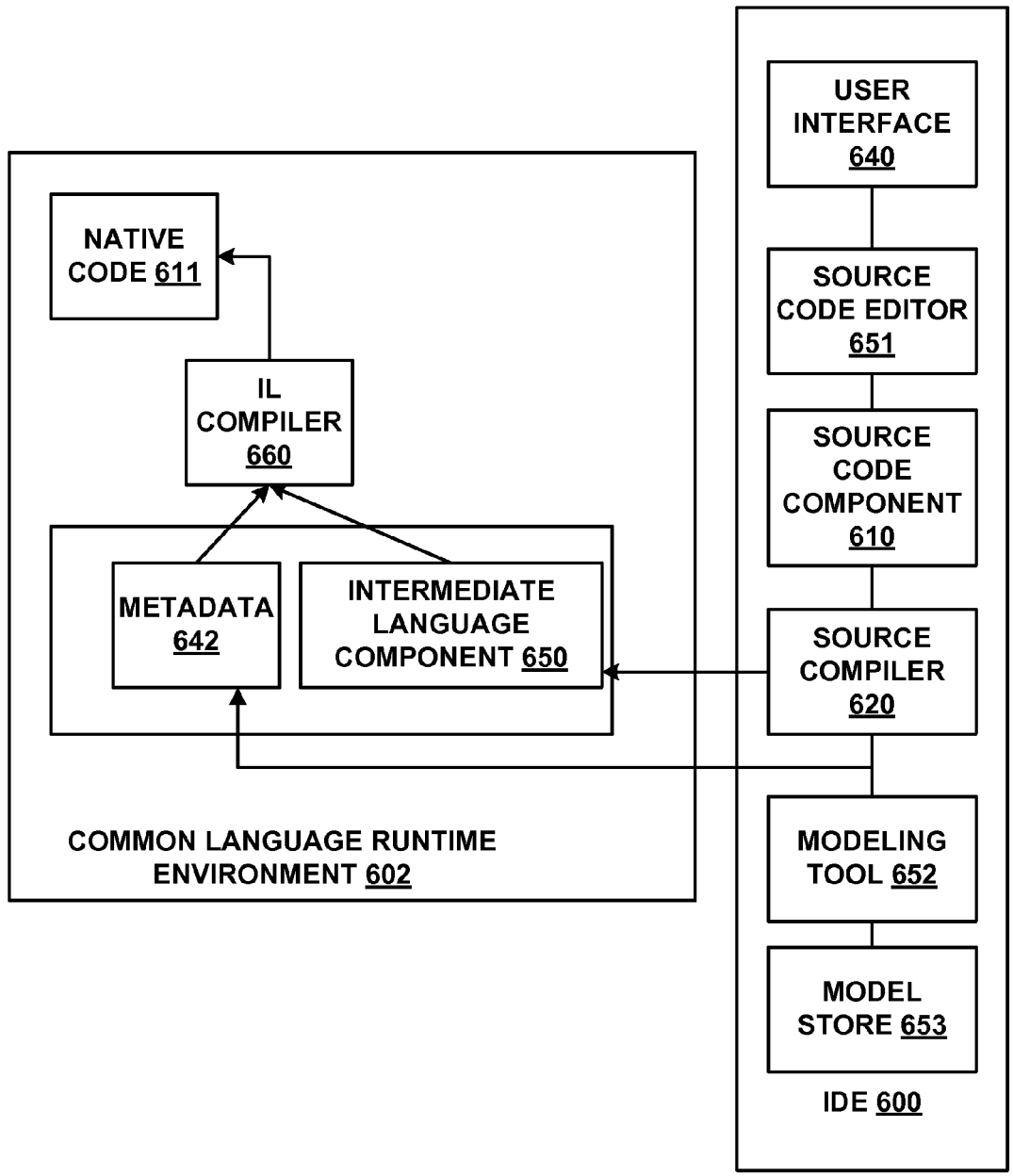
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
a processor and a memory of a computing device; and
a module on the computing device configured to cause the processor to:
receive a database artifact from a single software project within an integrated development environment (IDE), wherein the database artifact comprises one of a plurality of heterogeneous database artifacts, wherein the database artifact comprises a program file;
extract information associated with managed code objects from the program file;
determine relationships between the managed code objects; and
add definitions for the managed code objects and the determined relationships between the managed code objects to a common model;
wherein one or more tools in the IDE access the common model to provide interactive programming activities during design time in the IDE or to generate a database deployment plan.

2. The system of claim 1, wherein the database artifact comprises a Transact-Structured Query Language (T-SQL) file.

3. The system of claim 1, wherein the database artifact comprises an Extensible Markup Language (XML) Schema Definition (XSD) file.

4. The system of claim 1, wherein the database artifact comprises a program code file.

5. The system of claim 4, wherein the common model is accessed by auto-completion software.

6. The system of claim 1, wherein the common model is accessed by refactoring software.

7. The system of claim 1, wherein the common model is accessed by build and deployment software.

8. The system of claim 7, wherein the common model is accessed by build and deployment software accessed via a command line.

9. A method implemented on a computer having at least one processor, the method comprising:
receiving, via at least one processor, an artifact of a plurality of heterogeneous artifacts in a single software project within an integrated development environment (IDE), the artifact comprising a program file;

extracting information associated with managed code objects from the program file;

determining relationships between the managed code objects;

add definitions for the managed code objects and the determined relationships between the managed code objects to a common model; and enabling one or more tools in the IDE to access the common model to provide interactive programming activities during design time in the IDE or to generate a database deployment plan.

10. The method of claim 9, wherein the artifact comprises a Transact-Structured Query Language (T-SQL) artifact.

11. The method of claim 9, wherein the artifact comprises an Extensible Markup Language (XML) Schema Definition (XSD) artifact.

12. The method of claim 9, wherein the artifact comprises a program code artifact.

13. The method of claim 12, wherein the program code artifact comprises one of VB.NET code or C# code or F# code.

14. The method of claim 9, wherein the common model is accessed by auto-completion software.

15. The method of claim 9, wherein the common model is accessed by refactoring software.

16. The method of claim 9, wherein the common model is accessed by build and deploy software from within an integrated development environment or from a command line.

17. A computer-readable memory device comprising computer-executable instructions which when executed cause at least one processor to:

receive an artifact of a plurality of heterogeneous artifacts in a single software project within an integrated development environment (IDE), the artifact comprising a program file;

extract information associated with managed code objects from the program file;

determine relationships between the managed code objects;

add definitions for the managed code objects and the determined relationships between the managed code objects to a common model accessed by integrated development environment tools; and enable one or more tools in the IDE to access the common model to provide interactive programming activities during design time in the IDE or to generate a database deployment plan.

18. The computer-readable memory device of claim 17, comprising further computer-executable instructions, which when executed cause the at least one processor to:

receive the artifact comprising a Transact-Structured Query Language (T-SQL) artifact; and add information extracted from the T-SQL artifact, the extracted information comprising a database element definition, to the common model.

19. The computer-readable memory device of claim 17, comprising further computer-executable instructions, which when executed cause at least one processor to:

receive the artifact comprising an Extensible Markup Language (XML) Schema Definition (XSD) artifact;

extract a schema collection definition from the XSD artifact; and add the extracted schema collection definition to the common model.

20. The computer-readable memory device of claim 17, wherein the common model is accessed by one or more of auto-completion software, refactoring software, or build and deployment software.

\* \* \* \* \*